United States Patent [19]

Linden

[11] Patent Number: 4,657,290
[45] Date of Patent: Apr. 14, 1987

[54] CO-GENERATION PLANT MODULE SYSTEM

[76] Inventor: Craig L. Linden, 1335 Midway Dr., Alpine, Calif. 92001

[21] Appl. No.: 657,205

[22] Filed: Oct. 3, 1984

[51] Int. Cl.⁴ .............................................. F02G 5/02
[52] U.S. Cl. ....................................................... 290/2
[58] Field of Search ................... 290/2, 40 R; 60/645, 60/659; 237/12.1

[56] References Cited

U.S. PATENT DOCUMENTS

| | | | |
|---|---|---|---|
| 2,076,382 | 4/1937 | Minton | 290/2 |
| 2,273,502 | 2/1942 | Couse | 237/12.1 |
| 3,723,027 | 3/1973 | Montelius | 417/313 |
| 3,805,082 | 4/1974 | Murray | 290/2 X |
| 3,858,802 | 1/1975 | Stobart | 237/12.1 |
| 3,944,837 | 3/1976 | Meyers et al. | 290/40 R |
| 4,065,055 | 12/1977 | De Cosimo | 290/2 X |
| 4,150,300 | 4/1979 | Van Winkle | 290/2 |
| 4,226,214 | 10/1980 | Palazetti | 123/2 |
| 4,262,209 | 4/1981 | Berner | 290/2 X |
| 4,264,826 | 4/1981 | Ullmann | 290/2 |
| 4,330,084 | 5/1982 | Buchner et al. | 290/24 |
| 4,384,673 | 5/1983 | Carson | 237/12.1 |
| 4,495,901 | 1/1985 | Nannini et al. | 123/2 |
| 4,503,337 | 3/1985 | Hafner et al. | 290/2 X |
| 4,510,756 | 4/1985 | Hise et al. | 290/2 X |
| 4,527,071 | 7/1985 | Ausiello | 290/2 X |
| 4,548,164 | 10/1985 | Ylonen et al. | 123/2 |

FOREIGN PATENT DOCUMENTS 3239654  5/1984  Fed. Rep. of Germany.

Primary Examiner—William M. Shoop, Jr.
Assistant Examiner—W. E. Duncanson, Jr.
Attorney, Agent, or Firm—Fulwider, Patton, Rieber, Lee & Utecht

[57] ABSTRACT

A co-generation plant module system having a fluid tight housing with an internal chamber formed by a top wall, a bottom wall and side walls. A prime mover, such as an internal combustion engine, has its drive shaft connected to an electricity generator and both of these components are mounted on a sub-frame that would allow them to be raised up out of the internal chamber for servicing. An exhaust gas heat exchanger is mounted in the chamber and this is connected to the internal combustion engine. Air and fuel are supplied from outside the housing to the internal combustion engine. The exhaust gas leaving the exhaust gas exchanger is vented to the outside of the housing. The electricity generated by the generator is also connected to the outside of the housing. A layer of insulation of a predetermined R value insulates the walls of the housing. A sufficient volume of heat exchange fluid to submerge the internal combustion engine and generator is contained within the internal chamber of the fluid tight housing.

6 Claims, 2 Drawing Figures

CO-GENERATION PLANT MODULE SYSTEM

BACKGROUND OF THE INVENTION

The invention relates to a co-generation system and more specifically to one which is packaged as a module unit. In the past electricity has been generated by internal combustion engines and their fuel usage efficiency is generally less than 50 percent. Co-generation means that you are using the heat produced by the engine while you are generating electricity with an electrical generator. New co-generation systems have recently been designed to utilize the heat produced by these two major components. This has generally taken the form of having a heat exchanger attached to the engine and also a heat exchanger attached to the generator. Presently the efficiency rating of these co-generation systems are between 60 and 75 percent efficient.

It is an object of the invention to provide a novel co-generation system that is in modular form.

It is also an object of the invention to provide a novel co-generation system that mounts the engine and generator in an enclosed housing.

It is another object of the invention to provide a novel co-generation system that has the engine and generator submerged in the heat exchange fluid contained within a closed housing.

It is a further object of the invention to provide a novel co-generation system whose fuel efficiency approaches 95 percent.

It is an additional object of the invention to provide a novel co-generation system that is mounted within a fluid tight housing that functions as a huge heat exchanger and storage tank and which overcomes the normal lose of energy during its transfer process and the heat radiation to atmosphere.

SUMMARY OF THE INVENTION

Applicant's novel co-generation system has been designed in the form of a modular unit. It has a fluid tight housing having a top wall, a bottom wall and side walls. A layer of insulation of predetermined R value insulates the walls of the housing. A prime mover, such as an internal combustion engine, is connected to an electricity generator and these are mounted in the fluid tight housing on a sub-frame. The interior of the housing is filled with at least a sufficient volume of heat exchange fluid to submerge the internal combustion engine. In certain instances the fluid itself may be a lubricant that will allow use of a generator with reduced magnetic clearances and improved operating efficiencies.

The sub-frame allows the engine and alternator to be raised up out of the housing for servicing. Alternatively a drain plug could be located in one of the walls of the housing for emptying the heat exchange fluid therefrom.

The heat exchange fluid would be non electrical conductive and preferably have a high boiling point and a low freezing point. By having the engine submerged in the heat exchange fluid, more thermal energy is transferred to the fluid which acts as a thermal energy storage medium.

Also found within the fluid tight housing would be an exhaust gas heat exchanger that would be connected to the internal combustion engine. Suitable pipes would be connected from the outside of the housing to provide the fuel and air for combustion. Likewise suitable pipes could be connected to the housing to provide a hot fluid outlet and a return fluid inlet. Additionally the electrical conductors from the generator could be connected to a socket in the external wall of the housing. The insulated housing acts as a thermal storage bank.

The exhaust gas heat exchanger could be of the indirect tube type illustrated or a direct gas heat exchange to fluid type using a series of decreasing sized screens to divide exhaust into tiny bubbles for efficient heat transfer and scrubbing of pollutants from the exhaust stream. The fluid in the housing could be constantly filtered to trap the pollutants for easy disposal. Both of these methods would allow for very high heat transfer without corrosion problems which limit efficiency in the state of the art today.

A silencer could be mounted on the outside of the housing and connected to the exhaust gas heat exchanger within. Also a control panel could be mounted on the outside of the housing to start the engine automatically when it is desirable to produce thermal energy for use and also to supply electricity. Electricity not used on site could be sold to the utility company.

Other features that could be part of the system would be an oil heat exchanger built into the engine oil pan, a turbo-charger attached to the engine, and an afterburner for elevated exhaust temperatures during high thermal needs (i.e. a commercial laundry application would need more hot water than kilowatts of electricity).

In instances where it is undesireable to submerge the internal combustion engine, an alternative version would be to submerge the engine and desired components in foam insulation balls that could be used to fill the chamber. Additionally or alternatively the engine and generator themselves could be externally insulated to capture all the engine's heat within its waterjacket.

By raising the thermal transfer efficiences of the components of the system, reduced thermal energy losses are obtained. This means more energy per measure of fuel. Also less envirnmental pollution and impact is produced. The life of the internal combustion engine should be extended due to its near constant temperature of operation. Another benefit of applicant's novel system would be lower noise levels because the engine is mounted within the housing. By having the co-generation plant in a portable module form, the power plant can be moved to or positioned near the location where the thermal and electrical power is to be used.

DESCRIPTION OF THE PREFERRED EMBODIMENT

Figure 1:
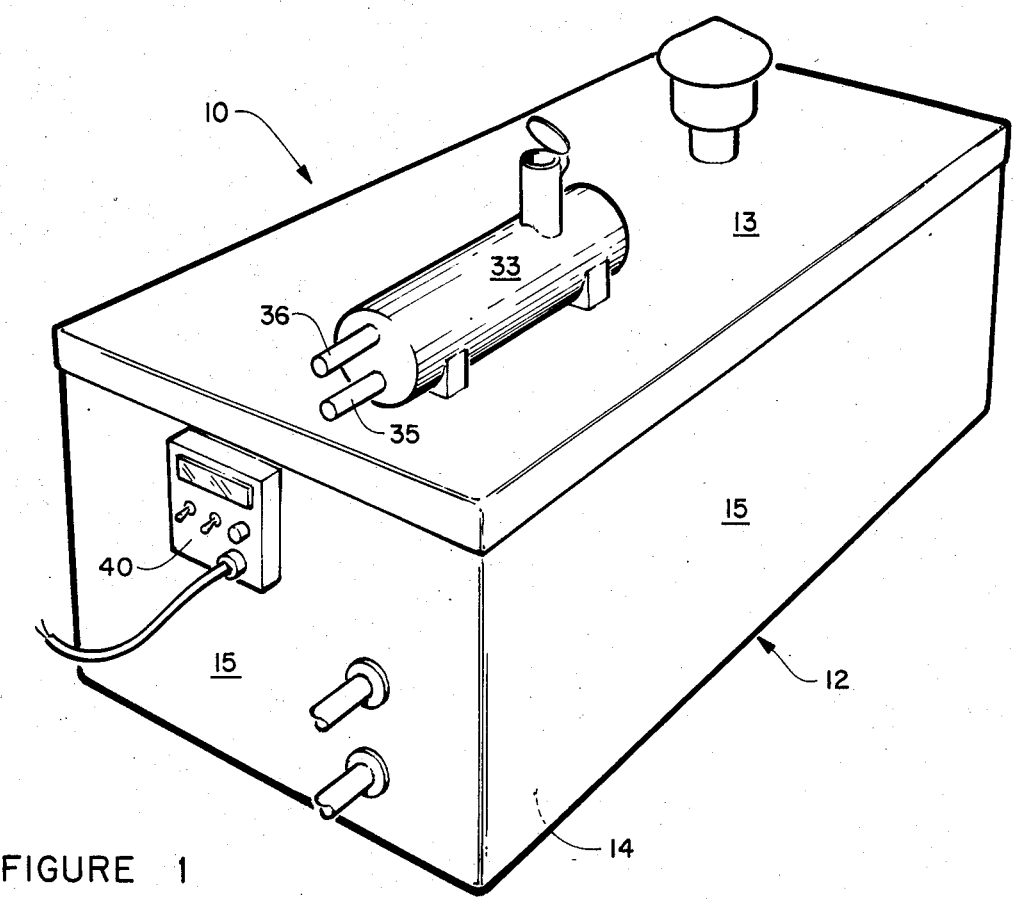
FIG. 1 is a perspective view of applicant's novel co-generation plant module.

The novel co-generation plant module is generally designated numeral 10. It has a fluid tight housing 12 having a top wall 13, a bottom wall 14, and side walls 15. An internal chamber 17 is formed within the fluid tight housing 12. A layer of insulation 19 of a predetermined R value insulates all of the walls of the housing 12.

Figure 2:
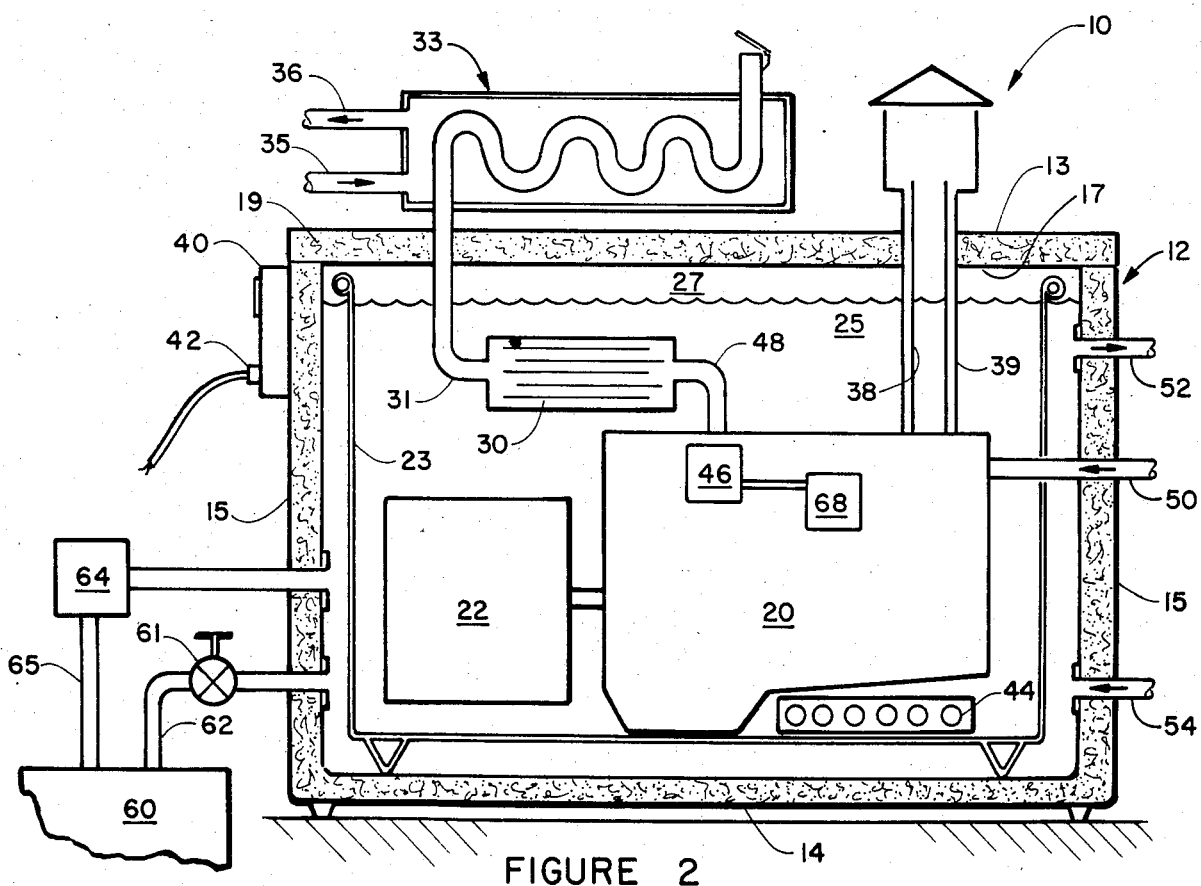
FIG. 2 is a schematic crosssectional view of the co-generation plant module.

Referring to the schematic illustration of FIG. 2, it is noted that a prime mover, for example such as an internal combustion engine 20 is connected to an electrical generator 22 and they are both mounted on a sub-frame 23. A heat exchange fluid 25 submerges the components within the housing 12. A portion 27 of the internal chamber provides an expansion area for fluid volume control.

An exhaust gas heat exchanger 30 is connected to engine 20. It has an exhaust pipe 31 that passes through the top wall of the housing and it is connected to a silencer 33. Silencer 33 may take the form of an oil or gas fired water heater that has been laid on its side and had its ignition components removed. A cold water inlet pipe 35 and a hot water outlet pipe 36 would allow the silencer to also function as a heat exchanger.

An air intake pipe 38 passes through the top wall of the housing and is connected to the internal combustion engine 20. Pipe 38 is surrounded by insulation 39.

A control panel 40 is mounted on the side of housing 20 and it has an electrical socket 42 which in turn is connected to the wires leading from the generator 22.

Engine 20 may also have an oil heat exchanger 44 built into the engine oil pan. Also a turbo-charger 46 could be mounted on engine 20. An accumulator 68 could be connected to said turbo-charger for storing compressed gases and releasing them into the intake manifold of the turbo-charged engine 20 for instant manifold boost. An afterburner 48 could be attached to the exhaust conduit of the engine to provide for elevated exhaust temperatures during high thermal needs. A fuel input tube 50 passes through one of the side walls of the housing.

A hot fluid outlet 52 and a return line 54 pass through the side wall of the housing 12.

A heat exchange fluid reservoir 60 may be provided for draining the fluid from the chamber within the housing. It would have a valve 61 in conduit 62 and a pump 64 in conduit 65.

What is claimed is:

1. A co-generation plan module system comprising:
    a housing having an internal chamber formed by a top wall, a bottom wall and side walls;
    an engine positioned within said chamber and characterized in operation by the generation of heat;
    means for circulating cooling fluid through said engine for collection of said heat and for circulating said cooling fluid to the exterior of said housing for extraction of said heat;
    means for supplying air from outside said housing to said engine;
    means for supplying fuel from outside said housing to said engine;
    an electricity generator mounted in said housing and being connected to said engine;
    means venting exhaust gas from said engine to the outside of said housing;
    means for carrying electricity generated by said generator to the outside of said housing; and
    heat insulating means completely filling the remaining space in said chamber whereby said heat insulating means comprises a quiescent thermal barrier tending to cause said heat to pass into said cooling fluid rather than into said heat insulating means.

2. A co-generation plant module system as recited in claim 1 further comprising means for draining said heat exchange fluid out of said internal chamber.

3. A co-generation plant module system as recited in claim 1 wherein said engine has an oil heat exchanger built into its engine pan.

4. A co-generation plant module system as recited in claim 1 further comprising means for turbo-charging said engine.

5. A co-generation plant module system as recited in claim 4 further comprising means for storing compressed gases and releasing them into the intake manifold of the turbo-charged engine for instant manifold boost.

6. A co-generation plant module system as recited in claim 1 further comprising afterburner means for the engine for elevating the temperatures during high thermo needs.

* * * * *